United States Patent
Babazadeh et al.

(10) Patent No.: US 9,929,663 B1
(45) Date of Patent: Mar. 27, 2018

(54) INDUCTOR PROTECTION DURING FAST TRANSIENT RESPONSE IN ISOLATED VOLTAGE CONVERTERS

(71) Applicant: Infineon Technologies Austria AG, Villach (AT)

(72) Inventors: Amir Babazadeh, Laguna Hills, CA (US); Darryl Tschirhart, Torrance, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/445,595

(22) Filed: Feb. 28, 2017

(51) Int. Cl.
| | |
|---|---|
| *H02M 3/335* | (2006.01) |
| *H02M 1/14* | (2006.01) |
| *H02M 1/08* | (2006.01) |
| *H02M 1/00* | (2006.01) |
| *H02M 1/16* | (2006.01) |

(52) U.S. Cl.
CPC ......... *H02M 3/33592* (2013.01); *H02M 1/08* (2013.01); *H02M 1/14* (2013.01); *H02M 1/16* (2013.01); *H02M 2001/0009* (2013.01); *H02M 2001/0054* (2013.01)

(58) Field of Classification Search
CPC ...... H02M 3/33592; H02M 1/14; H02M 1/08; H02M 1/16; H02M 2001/0009; H02M 2001/0054; H02M 1/32
See application file for complete search history.

(56) References Cited

U.S. PATENT DOCUMENTS

| 5,406,468 A | 4/1995 | Booth | |
| 8,526,204 B2 * | 9/2013 | Goto | H02M 3/33592 363/21.18 |
| 2014/0266123 A1 | 9/2014 | Rader | |

OTHER PUBLICATIONS

Cheung, Victor Sui-Pung et al., "Capacitor Current Programming Technique for Phase-Shift DC-DC Converter", 2011 IEEE Energy Conversion Congress and Exposition (ECCE), Sep. 17-22, 2011, pp. 1251-1258.
Mappus, Steve, "Current Doubler Rectifier Offers Ripple Current Cancellation", TI Application Note, System Power, SLUA 323, Sep. 2004.

(Continued)

*Primary Examiner* — Kyle J Moody
(74) *Attorney, Agent, or Firm* — Murphy, Bilak & Homiller, PLLC

(57) ABSTRACT

Techniques are provided for controlling power switches that couple an input power source to a transformer within a voltage converter, in order to control the power transfer through the transformer and to a load of the voltage converter. Different techniques are provided for different operational modes. In an initial steady-state interval, the switches are switched using a fixed first switching period and variable duty cycle. Upon detecting a load transient, e.g., a sudden increase in the load power requirements, a ramp-up interval is entered during which the switches are switched using a second switching period and a second duty cycle, in order to increase the output current of the converter at a maximum rate. Upon detecting that a current within the voltage converter has reached a maximum allowed level, a current-limited interval is entered during which the switches are switched using a third switching period and a third duty cycle.

20 Claims, 5 Drawing Sheets

(56) References Cited

OTHER PUBLICATIONS

Oggier, Germán G. et al., "Boundary Control of Full-Bridge ZVS: Natural Switching Surface for Transient and Steady-State Operation", IEEE Transactions on Industrial Electronics, vol. 61, No. 2, Feb. 2014, pp. 969-979.

Shi, Hongliang et al., "Dynamic Physical Limits of a Phase-Shifted Full Bridge Circuit for Power Supply of Magnetic Resonance Imaging Gradient Amplifiers", 41st Annual Conference of the IEEE, Industrial Electronics Society, IECON 2015, Nov. 9-12, 2015, pp. 4900-4904.

Tschirhart, Darryl et al., "Flux Limited Fast Transient Response in Isolated DC-DC Converters", U.S. Appl. No. 15/333,368, filed Oct. 25, 2016.

Tschirhart, Darryl et al., "Transformer Flux Estimation and Limiting in Isolated DC-DC Voltage Converters", U.S. Appl. No. 15/235,872, filed Aug. 12, 2016.

\* cited by examiner

INDUCTOR PROTECTION DURING FAST TRANSIENT RESPONSE IN ISOLATED VOLTAGE CONVERTERS

TECHNICAL FIELD

The present application relates to isolated voltage converters and, in particular, relates to techniques for limiting current through an inductor and avoiding transformer core saturation during transient load conditions of an isolated voltage converter.

BACKGROUND

Isolated direct-current (DC) to DC switching voltage converters use transformers to convert power from an input source into power for an output load. Such a voltage converter includes primary-side power switches that convert DC input power into alternating-current (AC) power that is fed to the primary side of a transformer. AC power supplied on the secondary side of the transformer is rectified to convert it back into DC power which, in turn, is provided to the output load.

In order to prevent damage to the primary-side power switches or the transformer itself, care must be taken to ensure that the core of the transformer does not magnetically saturate. This is typically accomplished by oversizing the transformer and/or using the current in the primary-side power switches to detect transformer core saturation. Should transformer core saturation be detected thusly, power transfer through the transformer is curtailed. More advanced techniques may track the transformer core flux, e.g., using a volt-second measure based upon a voltage of the transformer. A controller of the voltage converter may use the tracked transformer core flux to keep the flux well-balanced between positive and negative excursions, and to curtail power transfer if the tracked flux is approaching a level corresponding to a core saturation limit of the transformer.

A load transient, e.g., a step increase in the power required by the load, is preferably handled by increasing a current output from the voltage converter at a high rate until the voltage provided to the output load approaches a desired output level. The output current must be increased such that it does not cause saturation of the transformer core. Furthermore, the voltage converter components including, in particular, an output inductor must be sized such that a maximum output current is accommodated.

Techniques are desired for providing fast transient response within a voltage converter while avoiding transformer core saturation and without increasing the size of the transformer or an output inductor of the voltage converter.

SUMMARY

According to an embodiment of a method for controlling an isolated voltage converter that includes primary side switches coupled to a transformer having a transformer core, and an output inductor interposed between the transformer and a load of the isolated voltage converter, the method provides techniques for switching the primary side switches subsequent to a sudden increase in the power requirements of the load. These techniques allow for quickly responding to the load transient while ensuring that a current through the output inductor does not exceed prescribed limits. More particularly, the method begins with switching the primary side switches using a first switching period and a first duty cycle during an initial steady state interval. Upon detecting a load transient event associated with an increased power requirement of the load, the primary side switches are switched using a second switching period and a second duty cycle, such that the current flowing through the output inductor is increased at a maximum allowable rate during a ramp-up interval. Accordingly, the voltage converter responds to the increased power requirement of the load more quickly than might be possible using steady state control, e.g., a linear control technique. Upon detecting, during the ramp-up interval, that the current has reached a maximum allowed current, the primary side switches are then switched using a third switching period and a third duty cycle, during a current-limited interval, in order to maintain the current within a ripple current band between the maximum allowed current and a reduced current threshold. The third duty cycle differs from the second duty cycle.

According to an embodiment of an isolated voltage converter that is configured to provide output power to a load, the converter comprises primary side switches, a transformer coupled to the primary side switches and having a transformer core, an output inductor interposed between the transformer and the load, and a controller. The controller is configured to switch the primary side switches in order to provide power to the load during steady state operation, and to rapidly increase a current through the output inductor in response to a sudden increase in the load power requirements, while ensuring that the output inductor current does not exceed prescribed limits. More particularly, the controller switches the primary side switches using a first switching period and a first duty cycle during an initial steady state interval. Upon detecting a load transient event associated with an increased power requirement of the load, the controller switches the primary side switches using a second switching period and a second duty cycle, such that a current flowing through the output inductor is increased at a maximum allowable rate during a ramp-up interval, so as to accommodate the increased power requirement of the load. Upon detecting that the current has reached a maximum current threshold, a current-limited interval is entered during which the controller switches the primary side switches using a third switching period and a third duty cycle, in order to maintain the current within a ripple current band between the maximum current threshold and a reduced current threshold. The third duty cycle, as used during the current-limited interval, differs from the second duty cycle, which is used during the ramp-up interval.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments may be combined unless they exclude each other. Embodiments are depicted in the drawings and are detailed in the description that follows.

DETAILED DESCRIPTION

Figure 1:
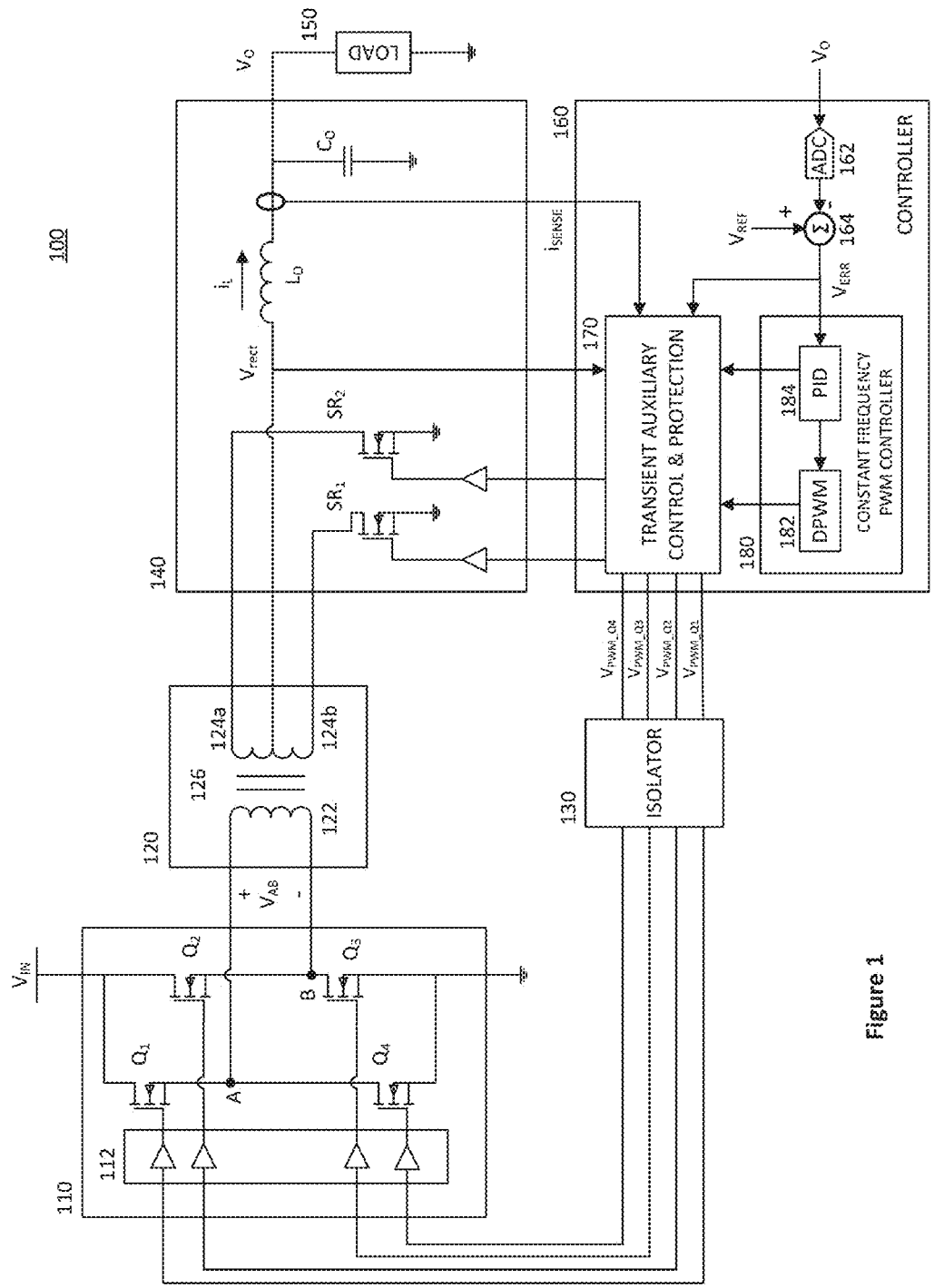
FIG. 1 illustrates a schematic diagram of an isolated voltage converter.

The embodiments described herein provide techniques for responding to transient load increases in an isolated voltage converter. These techniques increase an output current of the voltage converter at a maximum rate until a current limit of an output inductor is reached. Subsequent to reaching this limit, the current is maintained within a current ripple band until the output voltage has recovered from the load increase. The current ripple band is controlled by a switching frequency and a duty cycle that are used for switching primary side power switches of the voltage converter. The switching frequency and duty cycle are determined so as to balance switching losses, which are large with high switching frequencies, against the speed at which the voltage converter recovers from a load transient. The switching frequency and/or duty cycle used while limiting the current are different than a switching frequency and duty cycle used while increasing the current at its maximum rate. Use of these techniques allows for reducing the size of the output inductor while still providing fast recovery from transient load increases.

In sub-embodiments described herein, techniques are provided for preventing saturation of a core within a transformer of the isolated voltage converter. Such prevention is accomplished by tracking the magnetic flux within the transformer, e.g., using a volt-second measure, and altering the timing of switch pulses used in switching the primary side power switches. More particularly, techniques are described for maintaining the magnetic flux within prescribed limits during the ramp-up interval in which the output current is being increased at a maximum rate, during the interval in which the current is constrained to the current ripple band, and at the transition between these intervals. These techniques allow transformer miniaturization without degraded transient performance.

In other sub-embodiments described herein, techniques for increasing the current at a maximum rate are provided. In a preferred sub-embodiment for increasing the current, the power switches are switched at a switching frequency and duty cycle that are different from what is used during a steady-state operation of the voltage converter. For example, during the current ramp-up interval, the switch duty cycle may be set such that the primary side power switches are nearly always providing power to the transformer, while the switching frequency is reduced to a level that ensures the transformer flux limits are not exceeded. This allows a rate of current increase that is near the maximum possible, while maintaining transformer flux within the flux saturation limits of the transformer core. In an alternative sub-embodiment, the power switches are switched using the same switching frequency and duty cycle (typically variable) that is used during steady-state operation of the voltage converter. This alternative sub-embodiment offers the advantage of simplified control, but does not recover from a transient load increase as quickly as the preferred sub-embodiment.

The techniques described herein apply to both fixed and variable-frequency voltage converters. For clarity in the following description, voltage converters using a fixed switching frequency are shown, but it should be appreciated that the techniques could be applied to variable-frequency voltage converters.

Various embodiments of isolated voltage converters and control methods for isolated voltage converters are provided in the following detailed description and the associated figures. The described embodiments provide particular examples for purposes of explanation, and are not meant to be limiting. Features and aspects from the example embodiments may be combined or re-arranged, except where the context does not allow this.

FIG. 1 illustrates an embodiment of an isolated voltage converter 100 within which current-limited fast transient response techniques may be implemented. The illustrated voltage converter 100 is a full-bridge converter, but the techniques also apply to other push-pull topologies, active clamp forward topologies, half-bridge converters, etc. The voltage converter 100 includes a power stage 110, a transformer 120, an isolator 130, a conditioning circuit 140 and a controller 160. An input power source $V_{IN}$ provides power to the voltage converter 100, and the voltage converter 100 supplies output power to a load 150.

The input power source $V_{IN}$ is provided to the power stage 110, which couples it to the transformer 120 using power switches. The power stage 110 includes four power switches $Q_1$, $Q_2$, $Q_3$, $Q_4$, each of which has an associated driver within a driver stage 112. The switches $Q_1$, $Q_2$, $Q_3$, $Q_4$ are oriented in a full-bridge configuration. During an active interval within a positive half-cycle of the voltage converter 100, switches $Q_1$ and $Q_3$ are conducting, thereby producing a positive voltage across $V_{AB}$ that is provided to the transformer 120. During an active interval within a negative half-cycle of the voltage converter 100, switches $Q_2$ and $Q_4$ are conducting, thereby providing a negative voltage to the transformer 120 across its input $V_{AB}$. Additionally, there may be "dead time" intervals during which none of the switches $Q_1$, $Q_2$, $Q_3$, $Q_4$ are conducting and no voltage is provided to the transformer 120 across $V_{AB}$.

The power switches $Q_1$, $Q_2$, $Q_3$, $Q_4$ are illustrated in FIG. 1 as enhancement-mode metal-oxide semiconductor field-effect transistors (MOSFETs), but other switch types may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. The power switches $Q_1$, $Q_2$, $Q_3$, $Q_4$ may be integrated on the same semiconductor die, may each be provided on separate dies, or may otherwise be spread across a plurality of semiconductor dies. The drivers within the driver stage 112 may be integrated on the same semiconductor die(s) as their corresponding switches $Q_1$, $Q_2$, $Q_3$, $Q_4$, or may be provided on separate dies.

The transformer 120 includes a primary winding 122 having N1 turns, secondary windings 124a, 124b having N2 turns each, and a core 126. The secondary windings 124a, 124b are connected together at a center tap. A rectified voltage node $V_{rect}$ is coupled to this center tap. The turns ratio N1/N2 determines the ratio of the rectified voltage $V_{rect}$ to the input voltage $V_{AB}$ of the transformer 120.

The conditioning circuit 140 is configured to rectify the voltage output from the secondary windings 124a, 124b and to filter the rectified voltage $V_{rect}$ before it is provided to the load 150. As shown in FIG. 1, rectification switches $SR_1$, $SR_2$ are controlled by the controller 160 to produce the rectified voltage $V_{rect}$ from the AC voltage induced across the secondary windings 124a, 124b. Other rectification circuits or techniques may be used. For example, diodes may couple each outer terminal of the secondary windings 124a, 124b to a rectified voltage node, while the center tap is coupled to a ground of the load 150. In another alternate configuration, four diodes or four rectification switches in a bridge configuration may be used with a secondary winding that has no center tap. In general, such diode-based rectification is not preferred for low output voltages due to the power loss associated with the diodes, as compared with the active rectification using power switches $SR_1$, $SR_2$ as shown in FIG. 1. The use of a bridge configuration versus a center tap configuration is a design choice based on the performance of the voltage classes of the rectifier devices required for both configurations.

The conditioning circuit 140 also includes an output inductor $L_O$ and capacitor $C_O$ which form an LC filter. The LC filter serves to smooth the voltage $V_O$ provided to the load 150. The output inductor $L_O$ has a maximum current rating and must be sized such that the highest current flowing through the output inductor $L_O$ does not exceed this rating. The current $I_L$ flowing through the output inductor $L_O$ is typically at its highest value when there is a load transient, i.e., an instantaneous or near instantaneous increase in the power required by the load 150. The techniques described below limit the current $I_L$ through the output inductor $L_O$ so that the output inductor $L_O$ does not need to be significantly oversized relative to the size that is needed during steady-state operation of the voltage converter 100.

The controller 160 is responsible for controlling the voltage converter 100 in order to supply the necessary power (voltage $V_O$ and current) to the load 150. This includes controlling the rectification switches $SR_1$, $SR_2$ to generate the rectified voltage $V_{rect}$, and generating pulse-width-modulated (PWM) signals $V_{PWM\_Q1}$, $V_{PWM\_Q2}$, $V_{PWM\_Q3}$, $V_{PWM\_Q4}$ that control the switches $Q_1$, $Q_2$, $Q_3$, $Q_4$ of the power stage 110. Techniques for controlling rectification switches are well-known in the art, and such conventional techniques are not described here in order to avoid obscuring the unique aspects of this invention. The PWM waveforms $V_{PWM\_Q1}$, $V_{PWM\_Q2}$, $V_{PWM\_Q3}$, $V_{PWM\_Q4}$ that control the power switches $Q_1$, $Q_2$, $Q_3$, $Q_4$ are generated to ensure the load 150 is supplied adequate power, and this generation is typically based upon the output voltage $V_O$.

During steady-state operation of the voltage converter 100, conventional linear control techniques are used to generate PWM waveforms, based upon load requirements. The controller 160 of FIG. 1 generates PWM waveforms having a fixed switching frequency and a variable duty cycle. A constant frequency PWM controller 180 adjusts the duty cycle of the PWM waveforms in order to control the amount of power provided to the load 150. The constant frequency PWM controller 180 includes a proportional, integral and derivative (PID) controller 184 and a digital PWM waveform generator 182. The output voltage $V_O$ is digitized by an analog-to-digital converter (ADC) 162, and subtracted from a target reference voltage $V_{REF}$ using summer 164. The resultant error voltage $V_{ERR}$ is then provided to the PID controller 184. The PID controller 184 generates an update that informs the digital PWM generator 182 whether it should increase or decrease duty cycles used in the generation of the PWM waveforms that control the power switches $Q_1$, $Q_2$, $Q_3$, $Q_4$. For example, an output voltage $V_O$ that drops below the reference (target) voltage $V_{REF}$ causes a duty cycle of the PWM waveforms to increase, thereby increasing the power being transferred across the transformer 120. Conversely, an output voltage $V_O$ that rises above the reference voltage $V_{REF}$ forces the duty cycle of the PWM waveforms to be decreased, such that the power transferred across the transformer 120 is reduced. Because linear control techniques, such as PID control, are well-known in the art, they will not be described in further detail.

The controller 160 also includes transient auxiliary control and protection circuitry 170. During steady-state operation of the voltage converter 160, this circuitry 170 generates the PWM waveforms $V_{PWM\_Q1}$, $V_{PWM\_Q2}$, $V_{PWM\_Q3}$, $V_{PWM\_Q4}$ based upon outputs from the DPWM generator 182. Also during steady-state operation, this circuitry 170 may track the magnetic flux within the transformer core 126. This may be accomplished using a volt-second measure that is based upon the rectified voltage $V_{rect}$, winding turns (e.g., N2) of the transformer 120, and a cross-sectional area of the transformer 120. Alternatively, the volt-second measure may be based upon the primary-side voltage $V_{AB}$ or some secondary-side voltage other than the rectified voltage $V_{rect}$. The transient auxiliary control and protection circuitry 170 may modify the generated PWM waveforms to ensure that the volt-second measure stays bounded within limits corresponding to saturation limits of the transformer core 126. For example, the circuitry 170 may shorten PWM pulses if it is detected that the magnitude of the volt-second measure exceeds some threshold, or may shift energy from one set of PWM pulses to another. For the full-bridge converter 100 of FIG. 1, for example, the circuitry 170 may detect that the volt-second measure has reached a threshold $VS_{HIGH}$, which corresponds to a positive flux saturation level of the transformer core 126. In response to such detection, the circuitry 170 may immediately shorten PWM pulses on the PWM control signals waveforms $V_{PWM\_Q1}$, $V_{PWM\_Q3}$, that control the power switches $Q_1$, $Q_3$, and may lengthen PWM pulses on the PWM control signals waveforms $V_{PWM\_Q2}$, $V_{PWM\_Q4}$ that control the power switches $Q_2$, $Q_4$. This shifts magnetic flux from positive to negative intervals, while maintaining a desired energy transfer through the transformer 120.

The transient auxiliary control and protection circuitry 170 additionally detects transient load increases and detects if the inductor load current $I_L$ reaches an upper limit (threshold). In response to detecting either of these conditions, the circuitry 170 alters the PWM waveforms $V_{PWM\_Q1}$, $V_{PWM\_Q2}$, $V_{PWM\_Q3}$, $V_{PWM\_Q4}$ relative to what is generated by the DPWM generator 182 during steady-state operation of the voltage converter 100. More particularly, the circuitry 170 generates PWM waveforms having a switching frequency and duty cycle that may not be determined by the PID controller 184 and DPWM generator 182, when such conditions are detected. The operation of the transient auxiliary control and protection circuitry 170 will be described in further detail in conjunction with the waveforms of FIG. 2 and FIG. 3, and a more detailed embodiment of the circuitry 170 is provided in FIG. 4.

The controller 160 and its constituent parts may be implemented using a combination of analog hardware components (such as transistors, amplifiers, diodes, and resistors), and processor circuitry that includes primarily digital components. The processor circuitry may include one or more of a digital signal processor (DSP), a general-purpose processor, and an application-specific integrated circuit (ASIC). The controller 160 may also include memory, e.g., non-volatile memory such as flash, that includes instructions or data for use by the processor circuitry, and one or more timers. The controller 160 inputs sensor signals such as signals corresponding to the output voltage $V_O$ and the inductor current $I_L$.

Figure 2:
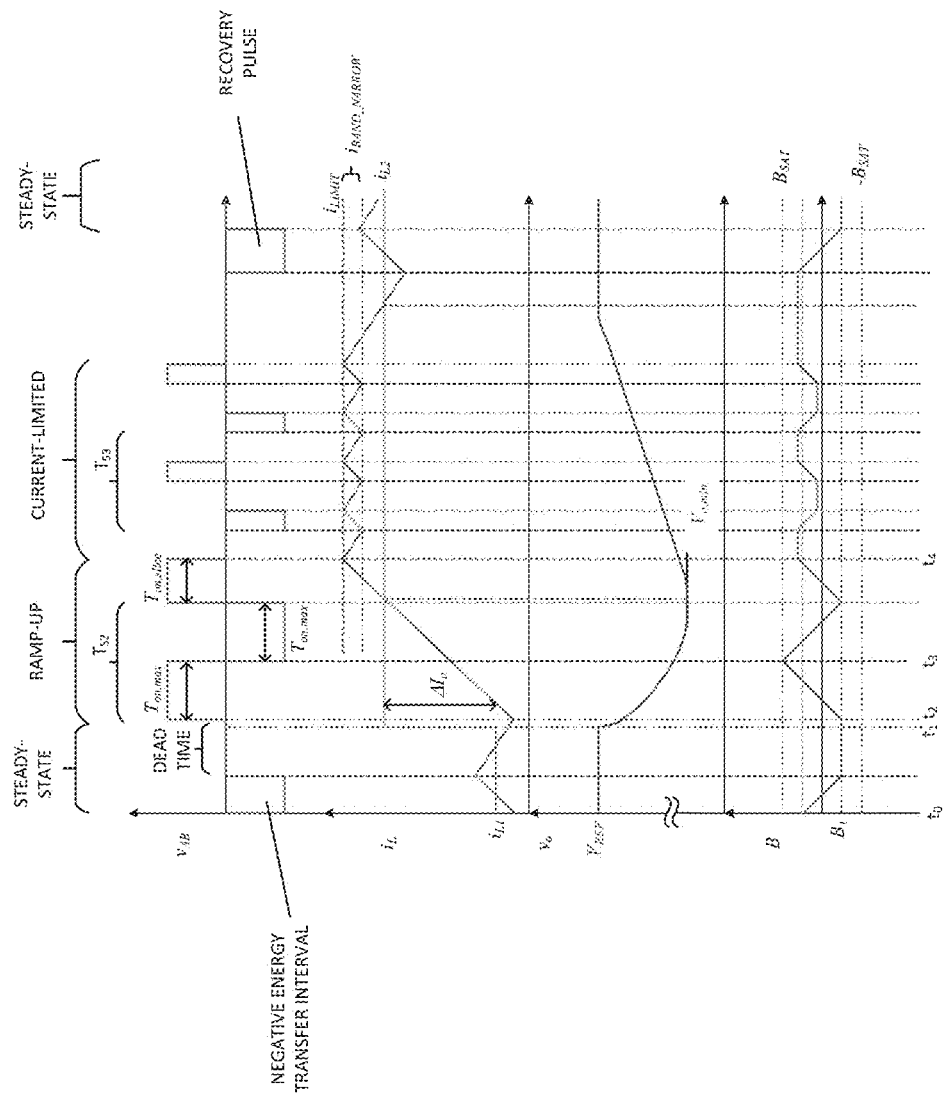
FIG. 2 illustrates waveforms associated with operation of the isolated voltage converter in steady state, current ramp up, and current limiting intervals.

FIG. 2 illustrates various waveforms associated with the operation of the voltage converter 100 during an initial steady-state mode, a current ramp-up interval within a transient mode, a current-limited interval within the transient mode, and a post-transient steady-state mode. These waveforms include a voltage $V_{AB}$ across the primary winding 122 of the transformer 120, current $i_L$ in the output inductor $L_O$ of the converter 100, voltage $V_O$ across the output capacitor $C_O$ and the load 150, and magnetic flux density B of the transformer core 126. FIG. 2 also shows, at time $t_1$, a transient load condition in which the load current changes from a first (lower) target value $i_{L1}$ to a second (higher) target value $i_{L2}$ and the corresponding difference $\Delta I_O$. Responsive to this transition in the target current, the controller 160 operates in a transient mode until the voltage $V_O$ supplied to the load 150 recovers, e.g., until $V_O$ reaches, or nearly reaches, the reference voltage $V_{REF}$ such that normal steady-state operation (control) may resume. Before and after the transient mode of operation, the controller 160 operates in a steady-state mode.

Initial Steady-State Mode

During an energy transfer interval within a positive half cycle of the voltage converter 100, primary side power switches $Q_1$ and $Q_3$ are conducting due to PWM pulses generated by the controller 160 on their corresponding control signals $V_{PWM\_Q1}$, $V_{PWM\_Q3}$. This produces a positive voltage $+V_{IN}$ across the input $V_{AB}$ to the primary winding 122 of the transformer 120. During an energy transfer interval within a negative half cycle of the voltage converter 100, primary side power switches $Q_2$ and $Q_4$ are conducting due to PWM pulses generated by the controller 160 on their corresponding control signals $V_{PWM\_Q2}$, $V_{PWM\_Q4}$. This produces a negative voltage $-V_{IN}$ across the input $V_{AB}$ to the primary winding 122 of the transformer 120. Energy circulation intervals occur between successive energy transfer intervals. For PWM control, a so-called dead time occurs during the energy circulation intervals in which none of the primary side power switches $Q_1$, $Q_2$, $Q_3$, $Q_4$ are conducting and no voltage is provided across the primary winding 122 of the transformer 120. Current does not flow in the primary side during energy circulation intervals under PWM control, only in the secondary side. For phase-shift-modulation (PSM) control, primary side power switches $Q_1$ and $Q_2$ conduct circulating current, or primary side power switches $Q_3$ and $Q_4$ conduct circulating current during energy circulation intervals. Accordingly, current circulates in both the primary and secondary sides during energy circulation intervals under PSM control. The operational details of the isolated voltage converter 100 are described herein in the context of PWM control for ease and simplicity of explanation. However, those skilled in the art will readily understand that the techniques described herein equally apply to PSM control.

With a standard PWM-based approach, the controller 160 switches the primary side power switches $Q_1$, $Q_2$, $Q_3$, $Q_4$ at a fixed (constant) first switching period $T_{S1}$ and a variable duty cycle D during steady-state (non-transient) load conditions, so as to transfer energy across the transformer 120 during positive and negative energy transfer intervals which are separated by energy circulation intervals. Consider a combined energy transfer interval $T_{energyTx}$ that includes both the positive and negative energy transfer intervals within the fixed switching period $T_{S1}$. The PID controller 184 and DPWM generator 182 determine a duty cycle D for each cycle of the voltage converter 100 such that the ratio of each combined energy transfer interval $T_{energyTx}$ to the fixed switching period $T_{S1}$ is less than unity, i.e., $T_{energyTx}/T_{S1}<1$. Accordingly, as shown in FIG. 2, ample dead time is provided between energy transfer intervals so as to allow the controller 160 to react to a transient load condition. This is illustrated in the waveform for the primary side voltage $V_{AB}$, wherein a negative half cycle is shown between times $t_0$ and $t_1$, and includes a negative energy transfer interval and a dead time interval. Preceding these intervals would be a positive energy transfer interval and another dead time interval, which are within the same cycle of the voltage converter 100 as the illustrated negative energy transfer interval. (For ease of illustration, the positive half cycle is not shown in FIG. 2.) It can be seen that the duty cycle D for the illustrated negative half cycle is approximately 40%.

Transient Mode Non-Linear Ramp-Up

Responsive to detection of a transient load increase, the controller 160 switches the primary side power switches $Q_1$, $Q_2$, $Q_3$, $Q_4$ of the voltage converter 100 at a second (ramp-up) switching period $T_{S2}$ that differs from the first (steady-state) switching period $T_{S1}$, so as to transfer energy across the transformer 120 during energy transfer intervals each having a duration $T_{on,max}$, and such that any energy circulation interval (e.g., dead time) separating the transient mode energy transfer intervals is shorter than the energy circulation intervals (e.g., dead times) separating the energy transfer intervals during steady-state operation. The second switching period $T_{S2}$ may be greater than or less than the first switching period $T_{S1}$. In a preferred embodiment, and as illustrated in FIG. 2, the second switching period $T_{S2}$ is less than the first switching period $T_{S1}$, such that the primary-side switches $Q_1$, $Q_2$, $Q_3$, $Q_4$ are switched at a higher switching frequency during the ramp-up interval as compared with the switching frequency ($f_{S1}=1/T_{S1}$) used during steady-state operation. Furthermore, a duty cycle D of nearly 100% is used during the ramp-up interval, i.e., the positive and negative energy transfer intervals during the ramp-up interval are separated by a negligible dead-time. (In order to protect the power switches $Q_1$, $Q_2$, $Q_3$, $Q_4$ and account for small timing mismatches in the isolator 130, drivers 112, etc., a small dead time is required between the positive and negative energy transfer intervals.)

As shown in FIG. 2, a load transient occurs at time $t_1$, i.e., the load current changes from a first (lower) target value $i_{L1}$ to a second (higher) target value $i_{L2}$. The controller 160 detects such a transient load increase, e.g., based upon $V_O$, $I_L$, and/or a signal that the load power requirements have changed. For example, the controller 160 may detect that the output voltage $V_O$ decreases significantly starting at time $t_1$. Similarly, the controller 160 may use the error voltage $V_{ERR}$ to detect a load transient, e.g, if the error voltage $V_{ERR}$ is greater than some threshold, a load transient is indicated. In another example, the controller 160 may sense a current flowing through the load 150 and detect a sharp increase in this current just after time $t_1$. In yet another embodiment, a controller associated with the load 150 may be aware that the load power requirements are changing, and signal such a change to the controller 160 at time $t_1$.

In response to detecting a transient load condition, the controller 160 converts from using the first switching period $T_{S1}$ to using the second switching period $T_{S2}$, and from using a first duty cycle that varies according to the load requirements to using a second duty cycle that is fixed. The second switching period $T_{S2}$ is based on the duration $T_{on,max}$ of the energy transfer intervals in the ramp-up interval, which correspond to the width of the ON time pulses applied to the primary side power switches $Q_1$, $Q_2$, $Q_3$, $Q_4$. The duration $T_{on,max}$ of the ramp-up energy transfer intervals is determined so as to avoid saturation of the transformer core 126. If the ramp-up energy transfer intervals were to exceed $T_{on,max}$, the magnetic flux density B in the transformer core 126 would increase/decrease to its positive/negative saturation limit. As illustrated in FIG. 2, the duration $T_{on,max}$ maintains the magnetic flux density B within the saturations limits $\{-B_{SAT}, +B_{SAT}\}$. Stated alternatively, the saturation limit $B_{SAT}$ of the transformer core 126 determines the duration $T_{on,max}$ which, in turn, determines the second switching period $T_{S2}$.

The input voltage $V_{IN}$ affects the slew rate of the magnetic flux density B in the transformer core 126. An increase in $V_{IN}$ correspondingly increases the slew rate of the magnetic flux density B. In a sub-embodiment, the controller 160 may adjust the duration $T_{on,max}$ of the energy transfer intervals in the ramp-up interval based upon the input voltage $V_{IN}$. For example, higher $V_{ON}$ translates to narrower $T_{on,max}$ pulses in the ramp-up interval. By adjusting the duration $T_{on,max}$ of the energy transfer intervals in the ramp-up interval based on a new input voltage magnitude for the voltage converter 100, saturation of the transformer core 126 may be avoided for the new input voltage magnitude during the ramp-up interval. Because the switching period $T_{S2}$ for the ramp-up interval is derived from $T_{on,max}$ as described above, the controller 160 also adjusts $T_{S2}$ based on the newly determined duration $T_{on,max}$ of the energy transfer intervals during the ramp-up interval. In the waveforms of FIG. 2, the duration $T_{on,max}$ is determined such that the magnetic flux increase from time $t_2$ to time $t_3$ increases from a level $B_1$ to a level that is just within the upper flux limit $+B_{SAT}$. The second switching period $T_{S2}$ is then set to a duration that is twice the duration $T_{on,max}$, plus small dead-time intervals for protecting the power switches $Q_1$, $Q_2$, $Q_3$, $Q_4$. (Such dead-time intervals are not illustrated within FIG. 2.)

The first switching period $T_{S1}$, which is used in the steady-state operational mode preceding the ramp-up interval, is determined in a wholly different manner than the second switching period $T_{S2}$. In the steady-state operating mode, the switching period $T_{S1}$ is fixed (constant) and determined based on various system parameters. The variable duty cycle of the PWM signals applied to the primary side switches $Q_1$, $Q_2$, $Q_3$, $Q_4$ during the steady-state mode is determined based on, e.g., the output voltage $V_O$ and the switching frequency $(f_{S1}=0.1/T_{S1})$, as described above regarding the constant frequency PWM controller 180. Accordingly, frequency is not used to provide regulation of the output voltage $V_O$ during steady-state operation, which is instead regulated using the variable duty cycle D. The variable duty cycle D and an ON time of the primary-side power switches $Q_1$, $Q_2$, $Q_3$, $Q_4$ are related by the first switching period $T_{S1}$ in the steady-state operation as given by Ton=D*$T_{S1}$. The maximum duty cycle Dmax may be set by the user, e.g., based on transformer saturation (Volt-Sec) limits, in a manner similar to the setting of the duration $T_{on,max}$ used during the ramp-up energy transfer intervals.

Transient Mode Linear Ramp-Up

In the preferred embodiments described above, the ramp-up interval uses non-linear control that differs from the linear control provided by the constant frequency PWM controller 180 and its constituent PID controller 184. In an alternative embodiment, the constant frequency PWM controller 180 is used to generate the switch control signals $V_{PWM\_Q1}$, $V_{PWM\_Q2}$, $V_{PWM\_Q3}$, $V_{PWM\_Q4}$ during the ramp-up interval. The constant frequency PWM controller 180 typically varies a duty cycle used in generating these signals in order to maintain the output voltage $V_O$ near the target voltage $V_{REF}$. However, the range of the allowable duty cycle is limited due, e.g., to transformer flux saturation limits. Responsive to a load transient event, the constant frequency PWM controller 180 will set the duty cycle to the maximum possible within the allowable duty cycle range. Hence, in this alternative embodiment, the maximum current increase will be limited by the maximum duty cycle allowed under PID control. This alternative embodiment will recover from the load transient considerably slower than the preferred embodiment described previously, but the control techniques are simplified.

Transient Mode Current Limiting

During the ramp-up interval, the controller 160 monitors the inductor current it and compares it against a current limit $i_{LIMIT}$. If the controller 160 detects that the inductor current reaches this threshold, the controller 160 enters a current-limited interval within its transient mode. The current limit $i_{LIMIT}$ may be set to a maximum current rating of the inductor $L_O$. During the current-limited interval, the output voltage $V_O$ is still well-below its target voltage $V_{REF}$ and, hence, it is desired to continue to provide a high-level of current to the load via the inductor $L_O$, in order to quickly recover from the transient load event. This current level is typically higher than the current that would be provided by a linear control technique such as that of the PID controller 184, but must be constrained beneath the current limit $i_{LIMIT}$.

In response to detecting that the inductor current $i_L$ has reached the current limit $i_{LIMIT}$, the controller 160 switches the primary side switch devices switches $Q_1$, $Q_2$, $Q_3$, $Q_4$ using a third switching period and a third duty cycle. This detection is illustrated in FIG. 2 at time $t_4$, where the ongoing energy transfer is curtailed. More particularly, the ongoing positive energy transfer interval is reduced to a duration of $T_{on,slice}$, in order to avoid having the inductor limit $i_L$ exceed the limit $i_{LIMIT}$. ($T_{on,slice}<T_{on,max}$) Subsequent to time $t_4$, the third switching period $T_{S3}$ and the third duty cycle are used. The third duty cycle, used within the current-limited interval, is less than the second duty cycle, which is used during the ramp-up interval. Reducing the duty cycle thusly prevents the inductor current from increasing above the limit $i_{LIMIT}$. The third switching period $T_{S3}$ is typically different than the second switch period $T_{S2}$, but may be the same. As illustrated in FIG. 2, the third switching period $T_{S3}$ is shorter than the second switch period $T_{S2}$.

The third duty cycle and the third switching period $T_{S3}$ determine a current ripple band, shown as $i_{BAND\_NARROW}$ in FIG. 2. The inductor current $i_L$ is constrained within the current ripple band, which extends from the upper limit $i_{LIMIT}$ to a reduced current limit. In order to respond more quickly to the transient event, a narrow current ripple band is used which, in turn, means a relatively short third switching period $T_{S3}$ should be used. However, a short third switching period $T_{S3}$ means that the power switches $Q_1$, $Q_2$, $Q_3$, $Q_4$ are switched more often which, in turn, leads to higher switching losses. A longer third switching period $T_{S3}$ leads to lower switching losses, but at the expense of a slower transient response.

Figure 3:
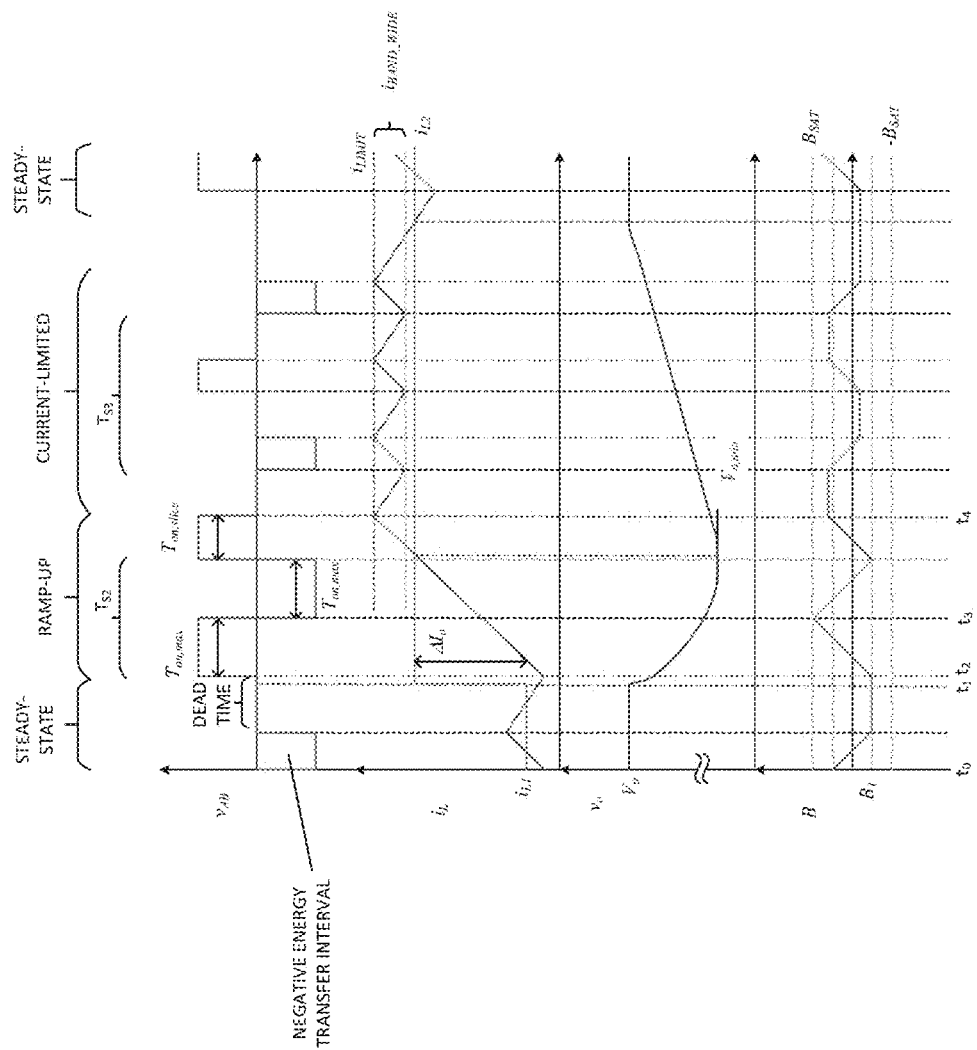
FIG. 3 illustrates waveforms associated with operation of the isolated voltage converter and which are similar to those of FIG. 2, except for having a wider current ripple band.

FIG. 2 illustrates a relatively narrow current ripple band $i_{BAND\_NARROW}$ and a corresponding third switching period $T_{S3}$ that is shorter than the second switch period $T_{S2}$. The voltage $V_O$ recovers from the transient event fairly quickly, but with relatively high switching losses. FIG. 3 illustrates similar waveforms, but wherein the current ripple band $i_{BAND\_WIDE}$ is wider than that of FIG. 2. Also in FIG. 3, the third switching period $T_{S3}$ that is longer than the second switching period $T_{S2}$. The switching losses for the third switching period $T_{S3}$ of FIG. 3 would be lower than the switching losses of FIG. 2, but the corresponding voltage $V_O$ recovery in FIG. 3 is slower than that of FIG. 2. The determination of the third switching period $T_{S3}$ is made to balance the switching losses against a desired transient recovery speed, and may vary according to the needs of individual applications.

Flux Tracking and Exiting Transient Mode

In preferred embodiments, the controller 160 tracks the magnetic flux B using a volt-second measure based upon the rectified voltage $v_{rect}$ and timing of control signals $V_{PWM\_Q1}$, $V_{PWM\_Q2}$, $V_{PWM\_Q3}$, $V_{PWM\_Q4}$ for the power switches. During steady-state operation of the voltage converter 100, the transient auxiliary control and protection circuitry 170 may alter the waveforms provided by the constant frequency PWM controller 180 in order to ensure the magnetic flux B within the transformer core 126 stays bounded within saturation limits $\{-B_{SAT}, +B_{SAT}\}$.

During the ramp-up interval, the controller 160 may determine the maximum ON duration $T_{on,max}$ (and the associated second switching period $T_{S2}$) based, in part on an estimate of the magnetic flux B. As illustrated in FIG. 2, the magnetic flux has a level of $B_1$ when the load transient occurs at time $t_1$. If the controller 160 is tracking the magnetic flux B, e.g., using a volt-second measure, then the transient auxiliary control and protection circuitry 170 can use the flux level $B_1$ and the upper saturation limit $B_{SAT}$, to determine a duration for $T_{on,max}$ that will ensure the saturation limits are not exceeded during the ramp-up interval. In a preferred sub-embodiment, this duration $T_{on,max}$ may then be used to determine the second switching period $T_{S2}$. In an alternate sub-embodiment, the controller 160 may use flux estimate tracking to dynamically determine the timing for the power switches $Q_1$, $Q_2$, $Q_3$, $Q_4$. For example, the controller 160 may begin a positive energy transfer interval at time $t_2$ and leave it enabled until a flux tracker detects that the estimated flux has reached a flux limit. The controller 160 may then stop the positive energy transfer interval and begin a negative energy transfer interval. The negative energy transfer interval may extend until the flux tracker detects that a negative flux saturation limit has been reached, at which point the negative transfer interval is stopped.

Using the techniques described above, the magnetic flux of the transformer core 126 should remain within saturation limits during the ramp-up interval. Because the duty cycle of the switching is reduced during the current-limited interval, the magnetic flux excursions will be constrained to a narrower range such that flux saturation is not problematic. However, magnetic flux tracking must again be considered before steady-state operation is re-started.

In a preferred sub-embodiment, a recovery switch pulse is generated after the current-limited interval and before entry into the steady-state mode. This recovery pulse has a polarity and duration that is determined such that the magnetic flux is returned to the magnetic flux level, e.g., $B_1$, that existed when the initial steady-state interval ended, e.g., at time $t_1$. Note that the recovery pulse of FIG. 2 is a negative energy transfer interval and has a duration that is the same as the duration $T_{on,slice}$ of the last pulse during the ramp-up interval. (The polarity of the recovery pulse is opposite that of the last pulse in the ramp-up interval.)

Transient Auxiliary Control and Protection Circuitry

Figure 4:
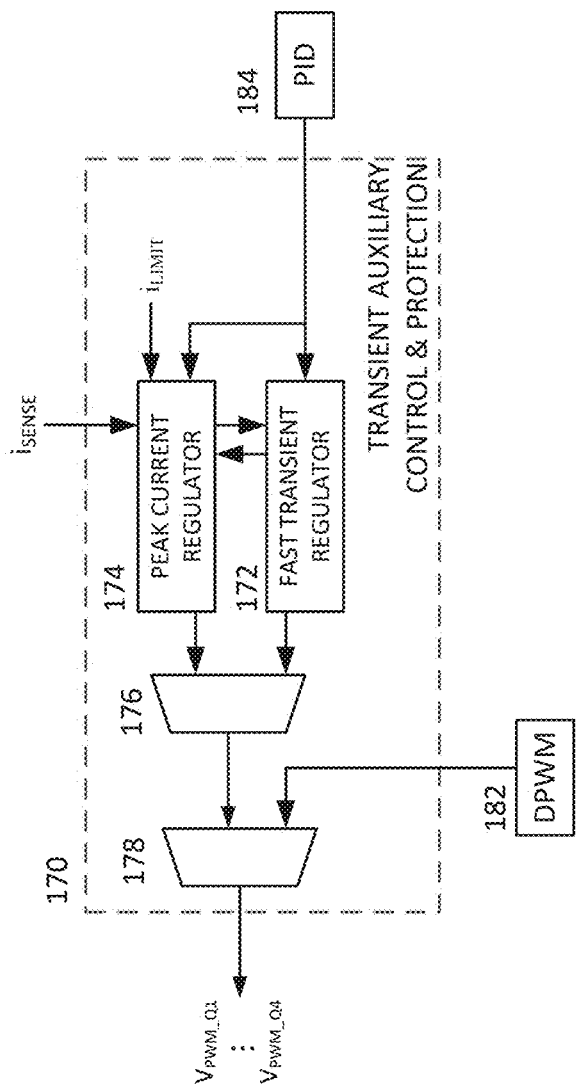
FIG. 4 illustrates an embodiment of transient auxiliary control and protection circuitry as included in the isolated voltage converter of FIG. 1.

FIG. 4 illustrates an embodiment of the transient auxiliary control and protection circuitry 170 of the voltage converter 100 in FIG. 1. This circuitry 170 includes a fast transient regulator 172, a peak current regulator 174, and multiplexors 176, 178.

The circuitry 170 detects a load transient indicating that the fast transient regulator 172 should be used to generate the power switch control signals $V_{PWM\_Q1}$ ... $V_{PWM\_Q4}$. In the illustrated embodiment, the load transient may be detected based upon an output from the PID controller 184. For example, the PID controller 184 may provide a duty cycle increase that would result in a duty cycle that is outside of an allowed duty cycle range that can be handled by linear control techniques, e.g., using the constant frequency PWM controller 180 of FIG. 1. In another alternative, the error voltage $V_{ERR}$ may rise above a threshold that indicates that linear control is no longer viable. (For ease of illustration, this is not shown in FIG. 4, but it is illustrated in FIG. 1.) Upon detection of the load transient, the fast transient regulator 172 generates control signals using the second switching period and the second duty cycle as described above regarding the waveforms of FIG. 2. The multiplexors 176 and 178 are set to output the signals generated by the fast transient regulator 172 during a ramp-up interval following such detection.

The peak current regulator 174 monitors a sensed current $i_{SENSE}$ of the output inductor $L_O$ and compares this current against an upper current limit $i_{LIMIT}$. The current $i_{LIMIT}$ may be stored in a memory of the controller 160, and will typically be set during a configuration of the voltage converter 100. If the sensed current $i_{SENSE}$ reaches or exceeds the upper current limit $i_{LIMIT}$, the circuitry 170 enters a current-limited interval in which the peak current regulator 174 generates the power switch control signals $V_{PWM\_Q1}$ ... $V_{PWM\_Q4}$. Upon entering the current-limited interval, the peak current regulator 174 generates control signals using the third switching period and the third duty cycle as described above regarding the waveforms of FIG. 2. The multiplexors 176 and 178 are set to output the signals generated by the peak current regulator 174 during the current-limited interval following such detection.

Upon recovery from the load transient, the peak current regulator 174 and the fast transient regulator 172 may be disabled, and the multiplexors 176, 178 may be set to generate the power switch control signals $V_{PWM\_Q1}$ ... $V_{PWM\_Q4}$ based upon the DPWM controller 182. Recovery from the load transient may be detected based upon an output from the PID controller 184. More particularly, if the duty cycle indicated by the PID controller 184 is within an allowable duty cycle range, then steady-state operational mode made resume using the PID controller 184 and DPWM generator 182. In an alternative detection technique, a voltage error $V_{ERR}$ that is below an acceptable threshold level may be used to indicate that steady-state operation may resume. (The voltage error signal $V_{ERR}$ is not illustrated in FIG. 4, but is shown in FIG. 1.)

Method for Fast Transient Response and Current Limiting

Figure 5:
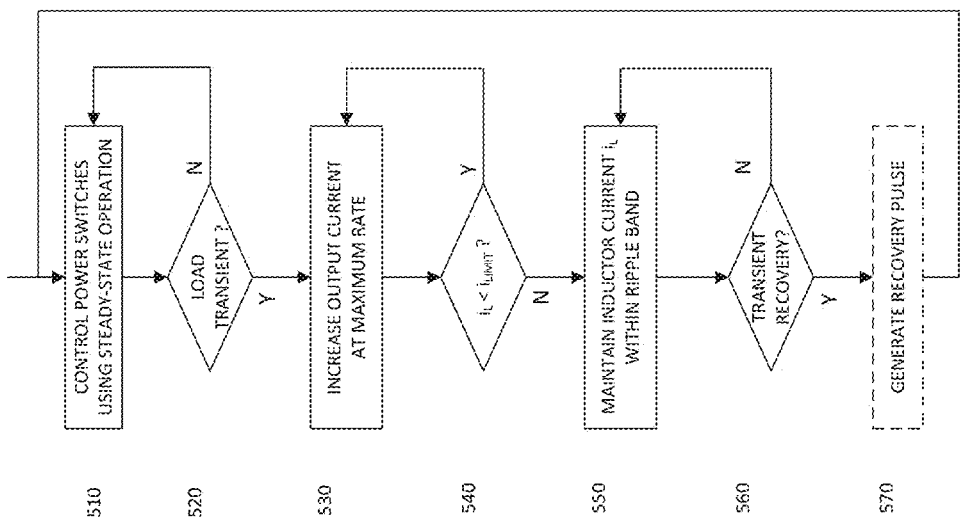
FIG. 5 illustrates a method, within an isolated voltage converter, for handling transient load increases and for limiting a current through an output inductor.

FIG. 5 illustrates a method 500 for responding to a load transient within a voltage converter. This method may be implemented, e.g., within a controller of the voltage converter. The techniques of this method 500 are similar to those described above regarding the voltage converter 100 of FIG. 1 and its associated description.

In a first step 510, primary side power switches are switched using a first (fixed) switching period and a first (variable) duty cycle during an initial steady state interval. This operation is continued as long as no load transient is detected 520. If a load transient is detected 520, a ramp-up interval is entered during which the primary side power switches are switched using a second switching period and a second duty cycle, such that the current flow through an output capacitor of the voltage converter is increased 530 at a maximum allowable rate. This increase continues until it is detected 540 that the current $i_L$ through the output inductor has reached a current limit $i_{LIMIT}$. Responsive to such detection 540, a current-limited interval is entered during which the power switches are switched using a third switching period and a third duty cycle, so as to maintain 550 the inductor current $i_L$ within a ripple band just below the current limit $i_{LIMIT}$. The third duty cycle differs from the second duty cycle. This interval is continued until it is detected 560 that the voltage converter has recovered from the load transient event, e.g., by detecting that an output voltage of the voltage converter is at or near a target output voltage. In an optional step 570, a recovery pulse is generated to control the power switches and to return the magnetic flux within a core of a transformer of the voltage converter to a level that existed prior to entry into the ramp-up interval. The method continues by re-entering steady-state operation 510.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of controlling an isolated voltage converter that comprises primary side switches coupled to a transformer having a transformer core, and an output inductor interposed between the transformer and a load of the isolated voltage converter, the method comprising:
    switching the primary side switches using a first switching period and a first duty cycle during an initial steady state interval;
    detecting a load transient event associated with an increased power requirement of the load;
    responsive to detecting the load transient event, switching the primary side switches using a second switching period and a second duty cycle, such that a current flowing through the output inductor is increased at a maximum allowable rate during a ramp-up interval, so as to accommodate the increased power requirement of the load;
    during the ramp-up interval, detecting that the current has reached a maximum current threshold; and
    responsive to detecting that the current has reached the maximum current threshold, switching the primary side switches using a third switching period and a third duty cycle, during a current-limited interval, in order to maintain the current within a ripple current band between the maximum current threshold and a reduced current threshold, wherein the third duty cycle differs from the second duty cycle.

2. The method of claim 1, wherein the third switching period is different from the second switching period.

3. The method of claim 1, further comprising:
    subsequent to switching the primary side switches using the third switching period and the third duty cycle, switching the primary side switches using the first switching period and the first duty cycle, in response to detecting that the increased power requirement of the load is being met, wherein the first switching period differs from the third switching period.

4. The method of claim 1, further comprising:
    subsequent to switching the primary side switches using the third switching period and the third duty cycle, generating a recovery pulse to switch the primary side switches, the recovery pulse having a recovery pulse polarity and a recovery pulse width that are determined such that a magnetic flux density of the transformer core is returned to a level of magnetic flux density that existed in the transformer core at the beginning of the ramp-up interval.

5. The method of claim 4, further comprising:
    tracking an estimate of the magnetic flux density of the transformer core during the ramp-up interval and the current-limited interval; and
    determining the recovery pulse polarity and the recovery pulse width based upon the tracked estimate of the magnetic flux density of the transformer core.

6. The method of claim 1, wherein the first switching period is a fixed value and the first duty cycle is variable, the first duty cycle being varied within a regulating duty cycle range so as to regulate a voltage provided by the isolated voltage converter to the load,
    wherein the second switching period is different than the first switching period, and the second duty cycle is greater than a maximum duty cycle within the regulating duty cycle range,
    wherein the maximum allowable rate of current increase is based upon the second switching period and the second duty cycle, and
    wherein at least one of the second switching period and the second duty cycle are determined based upon a maximum allowable magnetic flux density within the transformer core.

7. The method of claim 1,
    wherein the second switching period is equal to the first switching period as used by a linear control technique during the initial steady state interval,
    wherein the first duty cycle is variable, the first duty cycle being varied within a regulating duty cycle range having a maximum duty cycle that is allowable during the initial steady state interval,
    wherein the maximum allowable rate of current increase is based upon the first switching period and the maximum duty cycle, and
    wherein the maximum allowable duty cycle is based upon a maximum allowable magnetic flux density within the transformer core.

8. The method of claim 1, wherein the third switching period and the third duty cycle are determined based upon a maximum width for the ripple current band.

9. The method of claim 8, wherein the width of the current ripple band varies with an input voltage of the isolated voltage converter.

10. The method of claim 1, wherein the maximum current threshold is based upon a maximum current rating for the output inductor.

11. An isolated voltage converter configured to provide output power to a load, and comprising:
    primary side switches;
    a transformer coupled to the primary side switches and having a transformer core;

an output inductor interposed between the transformer and the load; and a controller configured to:
switch the primary side switches using a first switching period and a first duty cycle during an initial steady state interval;

detect a load transient event associated with an increased power requirement of the load;

responsive to detection of the load transient event, switch the primary side switches using a second switching period and a second duty cycle, such that a current flowing through the output inductor is increased at a maximum allowable rate during a ramp-up interval, so as to accommodate the increased power requirement of the load;

during the ramp-up interval, detect that the current has reached a maximum current threshold; and responsive to detection that the current has reached the maximum current threshold, switch the primary side switches using a third switching period and a third duty cycle, during a current-limited interval, in order to maintain the current within a ripple current band between the maximum current threshold and a reduced current threshold, wherein the third duty cycle differs from the second duty cycle.

12. The isolated voltage converter of claim 11, wherein the third switching period is different from the second switching period.

13. The isolated voltage converter of claim 11, wherein the controller is further configured to:
subsequent to switching the primary side switches using the third switching period and the third duty cycle, switch the primary side switches using the first switching period and the first duty cycle, in response to detecting that the increased power requirement of the load is being met, wherein the first switching period differs from the third switching period.

14. The isolated voltage converter of claim 11, wherein the controller is further configured to:
subsequent to switching the primary side switches using the third switching period and the third duty cycle, generate a recovery pulse to switch the primary side switches, the recovery pulse having a recovery pulse polarity and a recovery pulse width that are determined such that a magnetic flux density of the transformer core is returned to a level of magnetic flux density that existed in the transformer core at the beginning of the ramp-up interval.

15. The isolated voltage converter of claim 14, wherein the controller is further configured to:
track an estimate of the magnetic flux density of the transformer core during the ramp-up interval and the current-limited interval; and determine the recovery pulse polarity and the recovery pulse width based upon the tracked estimate of the magnetic flux density of the transformer core.

16. The isolated voltage converter of claim 11,
wherein the first switching period is a fixed value and the first duty cycle is variable, and the controller is further configured to vary the first duty cycle within a regulating duty cycle range so as to regulate a voltage provided by the isolated voltage converter to the load,
wherein the second switching period is different than the first switching period, and the second duty cycle is greater than a maximum duty cycle within the regulating duty cycle range,
wherein the maximum allowable rate of current increase is based upon the second switching period and the second duty cycle, and
wherein at least one of the second switching period and the second duty cycle are determined based upon a maximum allowable magnetic flux density within the transformer core.

17. The isolated voltage converter of claim 11,
wherein the second switching period is equal to the first switching period as used by a linear control technique during the initial steady state interval, the controller being further configured to perform the linear control technique,
wherein the first duty cycle is variable, and the controller is further configured to vary the first duty cycle within a regulating duty cycle range having a maximum duty cycle that is allowable during the initial steady state interval;
wherein the maximum allowable rate of current increase is based upon the first switching period and the maximum duty cycle, and
wherein the maximum allowable duty cycle is based upon a maximum allowable magnetic flux density within the transformer core.

18. The isolated voltage converter of claim 11, wherein the controller is further configured to:
determine the third switching period and the third duty cycle are determined based upon a maximum width for the ripple current band.

19. The isolated voltage converter of claim 18, wherein the controller is further configured to:
determine the maximum width of the ripple current band based upon a sensed input voltage of the isolated voltage converter.

20. The isolated voltage converter of claim 11, wherein the maximum current threshold is based upon a maximum current rating for the output inductor.

* * * * *